United States Patent [19]

Stonehill

[11] Patent Number: 5,492,053

[45] Date of Patent: Feb. 20, 1996

[54] BONDED PISTON AND SEAL ASSEMBLY

[75] Inventor: Mark A. Stonehill, Lebanon, Ind.

[73] Assignee: General Motors Corporation, Detroit, Mich.

[21] Appl. No.: 355,575

[22] Filed: Dec. 14, 1994

[51] Int. Cl.⁶ .................................................. F16J 9/00
[52] U.S. Cl. ................................ 92/241; 92/240; 92/107
[58] Field of Search ............................ 92/107, 108, 240, 92/241, 254, 253

[56] References Cited

U.S. PATENT DOCUMENTS

| | | | |
|---|---|---|---|
| 2,181,900 | 12/1939 | Langdon | 92/240 |
| 2,489,715 | 11/1949 | Marks, Jr. et al. | 92/241 |
| 3,037,781 | 6/1962 | Peras | 92/240 |
| 3,055,720 | 9/1962 | Price | 92/240 |
| 3,295,419 | 1/1967 | Vielmo et al. | 92/241 |
| 4,417,503 | 11/1983 | Izumi | 92/240 |
| 4,635,778 | 1/1987 | Lederman | 192/85 AA |

FOREIGN PATENT DOCUMENTS 643102  9/1950  United Kingdom ...................... 92/240

Primary Examiner—Thomas E. Denion
Attorney, Agent, or Firm—Donald F. Scherer

[57] ABSTRACT

A piston and seal assembly that has a rigid core with an elastomeric seal bonded thereto. The core has an annular outer cylindrical edge, a forwardly facing surface and a rearwardly facing surface. The elastomeric member is bonded to the core so as to encase the annular cylindrical edge. The elastomeric member extends outboard of the rearwardly facing surface of the core to provide a sealing lip. An annular concave surface merges with an annular convex surface located axially rearwardly of the rearward facing surface on the core. A radially outwardly directed surface on the lip portion merges tangentially with the convex surface.

12 Claims, 7 Drawing Sheets

BONDED PISTON AND SEAL ASSEMBLY

TECHNICAL FIELD

The present invention relates generally to piston and seal assemblies. More particularly, the present invention relates to piston and seal assemblies for use in torque transfer devices such as clutch and brake mechanisms. Specifically, the present invention relates to piston and seal assemblies for use in conjunction with torque transfer devices and having a rigid core with an elastomeric seal bonded thereto that is particularly adapted to operate effectively, even when subjected to a wide range of temperatures.

BACKGROUND OF THE INVENTION

Fluid-operated, torque transfer devices used as drive ratio establishing devices, such as clutches and brakes, in vehicular transmissions frequently utilize a pressure-operated piston that is slidably disposed within a chamber. Such pistons are generally provided with one or more annular seals that cooperate with the annular walls of the chamber to prevent leakage of hydraulic fluid therebetween when the torque transfer device is pressurized— i.e.: during engagement of the torque transfer device to select a specific drive ratio. Generally, the seals are either "O" rings or "square" rings which are fitted in a groove provided in the piston in a manner such that the walls of the cylinder will be physically engaged thereby to seal the chamber.

Other torque transfer or similar devices use a bonded piston and seal assembly—such as that shown in U.S. Pat. No. 4,635,778 issued Jan. 13, 1987, to Lederman and assigned to the assignee of the present invention—to provide an assembly that is more easily manipulated in production. These assemblies typically have a rigid core, generally made of steel, to which an elastomeric member is bonded. These assemblies have been found very useful in the manufacture of vehicular transmissions. Other known bonded piston and seal assemblies have an outer periphery comprised of two annular nodes which provide a piston support rib and a transition rib. At least one, and usually both, of the nodes is aligned transversely with respect to the axis of the rigid core.

The prior art piston and bonded seal assemblies often exhibit a drawback when the transmission is subjected to extensive temperature fluctuations. For example, if the temperature ranges from a low of at least minus thirty degrees Fahrenheit (−30° F.) to a high of more than about three hundred degrees (300° F.), the seal material disposed about the rigid core is severely stressed and can become detached from the core at or near the intersection of an annular wall with a radially wall of the seal. This separation will generally occur on the pressure side of the piston.

SUMMARY OF THE INTENTION

It is, therefore, a primary object of the present invention to provide a novel piston and seal assembly that will not be adversely affected by exposure to temperature fluctuations that were deleterious to prior art piston and seal assemblies.

It is another object of the present invention to provide an improved piston and seal assembly for use in conjunction with a torque transfer device in a power transmission wherein a seal member is bonded to a rigid core.

It is a further object of the present invention to provide an improved piston and bonded seal assembly, as above, wherein the seal has a skin portion and a lip portion disposed axially rearwardly of the skin portion— an annular concave surface and an annular convex surface which merges tangentially through a conical reference with the concave surface effecting the transition from the skirt portion to the lip portion.

It is a still further object of the present invention to provide an improved piston and bonded seal assembly, as above, that maintains a clearance between that portion of the seal that is bonded to the outer periphery of the core and the walls of the chamber within which the piston and seal assembly reciprocates.

It is yet another object of the present invention to provide an improved piston and bonded seal assembly, as above, wherein the aforesaid clearance is maintained throughout the operating range of the transmission.

These and other objects of the invention, as well as the advantages thereof over existing and prior art forms, which will be apparent in view of the following derailed specification, are accomplished by means hereinafter described and claimed.

In general, a piston and seal assembly embodying the concepts of the present invention utilizes a rigid core and an elastomeric seal. The outer periphery of the seal has a profile that serves to overcome the temperature range limitations imposed on prior art seals. The core has an annular outer wall and two radially extending axially facing surfaces to which an elastomeric seal is bonded. The outer periphery of the elastomeric seal has a substantially cylindrical surface that is disposed radially outboard of the annular wall on the core. The elastomeric seal has a concave portion that merges tangentially—along a conical reference—with a convex portion which extends axially beyond the annular outer wall of the core to merge tangentially with the concave surface of the engaging lip.

The unique peripheral shape of the elastomeric seal provides a piston-like fit within the piston cylinder when assembled in a transmission. The concave-convex-concave configuration of the seal which extends radially outwardly and axially rearwardly from the skirt portion that is secured to the core provides a fluid tight seal with the piston chamber within which the piston and seal assembly is received, while affording a continuous clearance between the annular portion of the seal and the piston chamber within the entire operating temperature range to which the transmission incorporating the piston and bonded seal assembly is incorporated. This peripheral shape also reduces the stress at the interface of the rigid core and the seal material, thus preventing separation of the seal material from the core.

To acquaint persons skilled in the arts most closely related to the present invention, one preferred embodiment of a piston and seal assembly— and an alternative version thereof—adapted for use with a fluid-operated piston-apply torque transfer device that illustrates two best modes now contemplated for putting the invention into practice are described herein by, and with reference to, the annexed drawings that form a part of the specification.

The exemplary piston and seal assemblies are described in detail without attempting to show all of the various forms and modification in which the invention might be embodied. As such, the embodiments shown and described herein are illustrative, and as will become apparent to those skilled in these arts, can be modified in numerous ways within the spirit and scope of the invention; the invention being measured by the appended claims and not by the details of the specification.

DESCRIPTION OF AN EXEMPLARY EMBODIMENT

Figure 1:
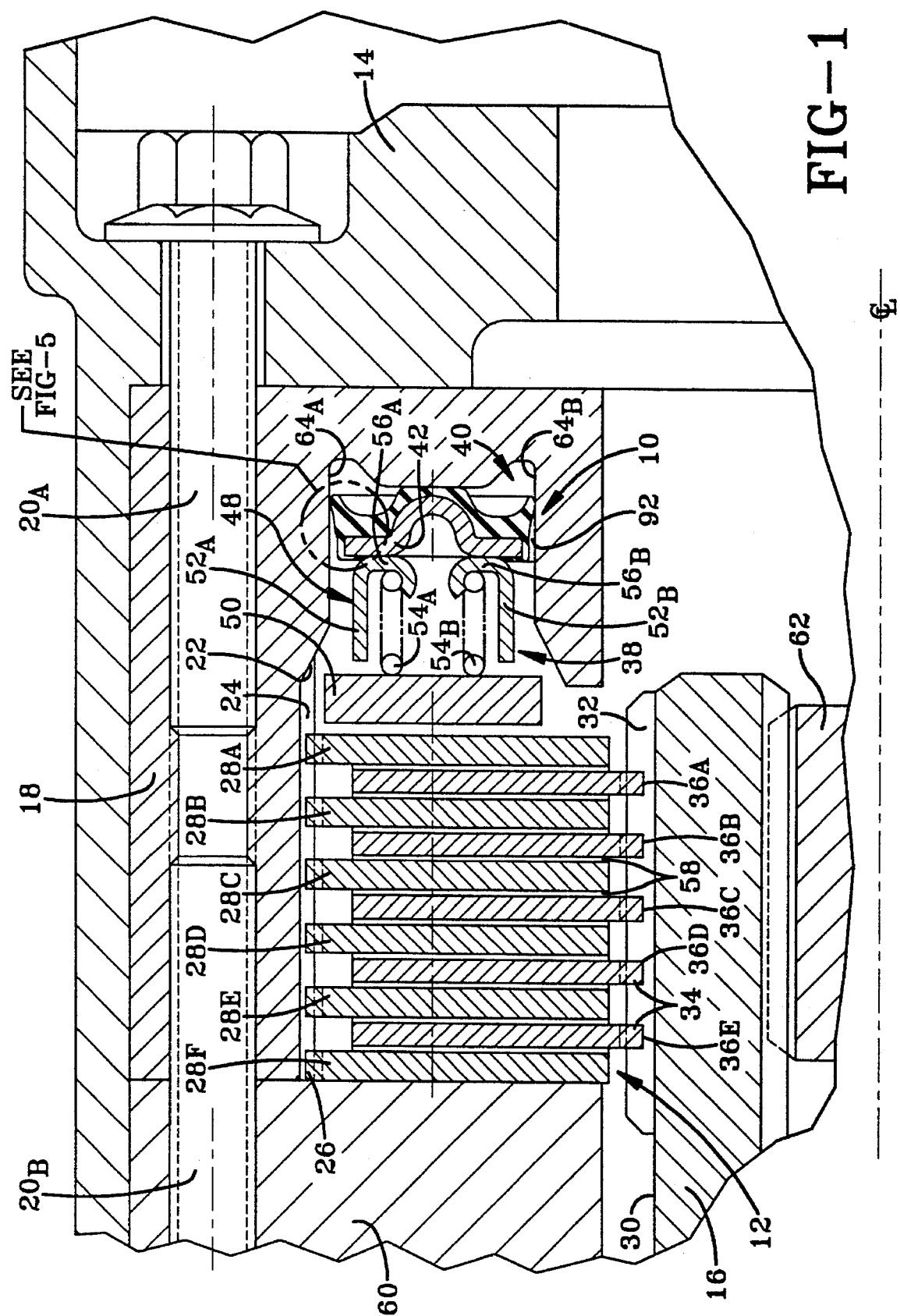
FIG. 1 is a longitudinal section through a portion of a transmission in order to depict a torque transfer assembly having an actuating piston that utilizes a seal embodying the concepts of the present invention.

One representative form of piston and seal assembly embodying the concepts of the present invention is designated generally by the numeral 10 on the accompanying drawings. The representative piston and seal assembly 10 is depicted in conjunction with a torque transfer device 12 of the type used in automatic power-shifting planetary transmissions. The torque transfer device 12 is interposed between two relatively rotatable members 14 and 16. The first of the relatively rotatable members may, for example, comprise the transmission housing 14—or a member such as the annular cylinder block 18 which, in the embodiment depicted, is fixedly secured to the transmission housing 14, as by a plurality of axially extending fasteners in the form of machine bolts $20_A$.

The second relatively rotatable member may comprise the ring gear 16. Whereas at least one of the members 14 or 16 is rotatable, it must be understood that the other member 16 or 14 may be either rotatable or fixed. That is, the actuating piston assembly 10 may be employed either in conjunction with a clutch mechanism or a brake mechanism. The arrangement depicted, because one of the relatively rotatable members (the cylinder block 18 attached to the transmission housing 14) is fixed and the other relatively rotatable member (the ring gear 16) is generally rotatable, the torque transfer device 12 operates as a brake.

As previewed in the previous paragraph, and as will appear in the detailed description which follows, similar structural members, components or arrangements may be employed at more than one location. A common numerical designation shall be employed when those members, components or arrangements are to be designated generally, but when the similar members, components or arrangements so identified are to be specifically designated, they shall be referenced by virtue of a letter subscript employed in combination with the numerical designation employed for general identification of that structural member, component or arrangement. Thus, there are similar, but distinct, fasteners in the form of machine bolts, and those fasteners are generally identified by the numeral 20, but the specific individual fasteners are, therefore, identified by the alphanumeric designations $20_A$ and $20_B$ in the specification and on the drawings. This alphanumeric convention shall be employed throughout the specification.

Continuing with the description of the exemplary embodiment, the radially inner surface 22 of the annular cylinder block 18 may be provided with a plurality of circumferentially spaced axially extending grooves 24 to receive the tangs 26 of a plurality of first annular torque plates 28 and thereby assure that the first annular torque plates 28 are not relatively rotatable with respect to the cylinder block 18, irrespective of whether the block 18 is itself rotatable or fixed. To assure that the interaction between the block 18 and the tangs 26 is sufficient to withstand the loading to which the torque plates 28 will be subjected, a plurality of the axially extending grooves 24 are employed at circumferentially spaced intervals about the inner surface 22 of the annular cylinder block 18, and each of the first annular torque plates 28 are provided with a sufficient number of tangs 26 to interact with those grooves 24, as is well known to the art.

Similarly, the radially outer surface 30 on the ring gear 16 may be provided with a plurality of axially extending ribs 32 at circumferentially spaced intervals to engage the several tangs 34 which extend radially inwardly from each of the plurality of second annular torque plates 36 and thereby assure that the second annular torque plates 36 will not rotate relative to the ring gear 16, as is also well known to the art.

An annular piston chamber 38 within the cylinder block 18 slidably supports the bonded piston and seal assembly 10. The piston and seal assembly 10 cooperates with the piston chamber 38 to form a pressure subchamber 40 into which pressurized fluid is selectively admitted in a well known manner to actuate the torque transfer device 12 which, as was previously described, is serving as a brake.

The piston and seal assembly 10 includes a rigid core 42 (best seen from FIG. 2) that may preferably be made of steel, and an elastomeric seal 44 that may be operatively bonded to at least the cylindrical edge 46 that defines the radially outer periphery on the radially extending outer annular wall 47 of the core 42. The specific details by which the bonding of the seal 44 to the core 42 may be accomplished are hereinafter described in greater detail.

A resilient pressure-apply disk assembly 48 operatively engages the core 42. As best seen in FIG. 1, the pressure-apply assembly 48 has an annular apply disk 50 that cooperatively interacts with the core 42 through a pair of concentrically disposed rigid force transfer rings $52_A$ and $52_B$ and springs $54_A$ and $54_B$ that extend between the opposed bases $56_A$ and $56_B$ of the transfer rings $52_A$ and $52_B$, respectively, and the apply disk 50. The annular apply disk 50 is disposed operatively to engage the pressure-apply torque plate 28A which is drive-connected to the cylinder block 18, as previously described.

As previewed in the previous paragraph, and as will appear in the detailed description which follows, a particular structural member, component or arrangement may be employed at more than one location. When referring generally to that type of structural member, component or arrangement a common numerical designation shall be employed. However, when one of the structural members, components or arrangements so identified is to be individually designated it shall be referenced by virtue of a letter suffix employed in combination with the numerical designation employed for general identification of that structural member, component or arrangement.

Thus, there are a plurality of pressure-apply torque plates, and the pressure-apply torque plates are generally identified by the numeral 28, but the specific, individual pressure-apply torque plates are, therefore, identified as torque plates 28A, 28B, etc. in the specification and on the drawings. This alphanumeric convention shall also be employed throughout the specification.

The reaction torque plates 36 are alternately interleaved with the pressure-apply torque plates 28, and the reaction torque plates 36 are drivingly connected with the ring gear 16, as previously explained. A plurality of annular friction disks 58 are interposed between the pressure-apply torque plates 28 and the reaction torque plates 36. A backing block 60, which is also secured to the housing 14 and cylinder block 18 (as by a plurality of axially extending fasteners in the nature of machine bolts $20_B$), is disposed adjacent the apply torque plate 28F. As such, when fluid pressure is admitted to the subchamber 40, the piston and seal assembly 10 will axially displace the annular apply disk 50 to compress the interleaved torque plates 36 and 28 into engagement with the friction disks 58 therebetween and thereby brake the ring gear 16 in a well known manner.

The ring gear 16 is a member in a planetary gear set which includes planetary pinions 62 and a sun gear, not shown, arranged to cooperate in a well known manner so that the transmission can provide the desired speed ratio.

The transmission operates across a wide range of temperatures— for example from −30° to 300° Fahrenheit (−34.4° C. to 148.9° C.). This range is occasioned when the vehicle incorporating the transmission is started in a cold weather climate and operated until the transmission reaches normal operating temperatures, which under heavy loads, can reach 300° Fahrenheit (148.9° C.). During operation of the vehicle within the transmission range controlled by the torque transfer devices 12, it is necessary to maintain the pressure subchamber 40 substantially sealed when the torque transfer device actuated by the pressure in that subchamber 40 is engaged. That seal serves to prevent relatively rotational slippage of the torque plates 28 and 36. Thus, the brake engaged by the torque transfer device 12 depicted will operate effectively only so long as that seal is maintained. Under cold temperature start-up and working conditions, some prior art bonded seals can have a significantly tight fit between the outer periphery of the rigid core and the cylinder wall. This can result in a tearing of the seal at that location. When the seal has been torn it will, after a time, permit sufficient fluid leakage to require a repair operation.

The present invention alleviates and prevents an excessively tight fit between the core 42 and the radially outer interior wall $64_A$ of the piston chamber 38, while retaining the sealing integrity of the assembly 10 and thereby increasing the working life of the transmission. This is accomplished by virtue of a unique shape on at least the radially outer periphery 66 of the radially outer lip portion 76 of the elastomeric seal 44. The elastomeric seal 44 is bonded to the rigid core 42 in a well known manner, such as may be accomplished by a molding procedure, and the mold establishes the shape of the outer periphery 66. The unique shape is effective to reduce the stresses between the interior wall 64 of the core 42 and the seal material.

Figure 2:
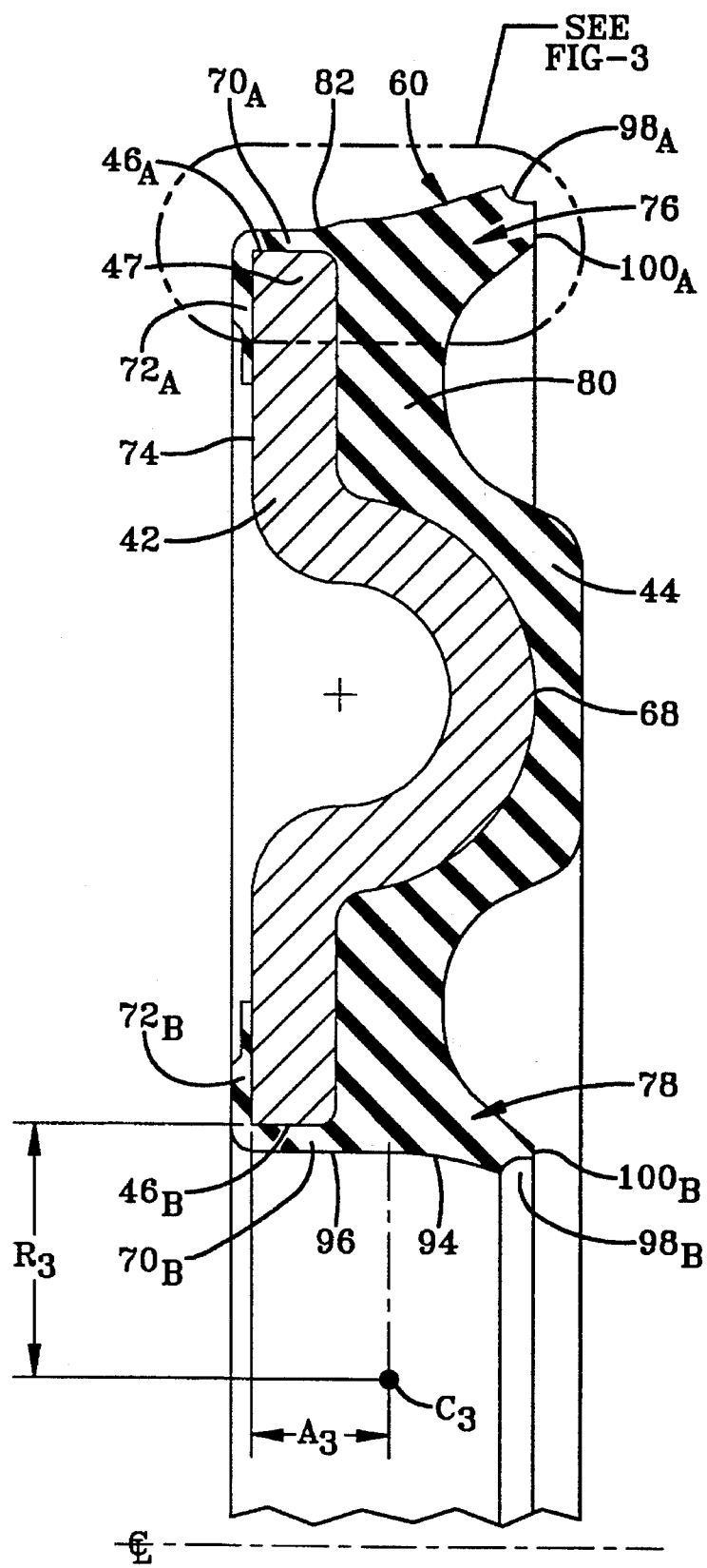
FIG. 2 is an enlarged radial section of the seal appearing in FIG. 1, but in an unassembled, stress-free state.

The elastomeric seal 44, as best seen in FIG. 2, covers the entire axially facing rearward surface 68 of the core 42—which faces the pressure subchamber 40.

For a frame of reference, the subchamber 40 will be assumed to lie rearwardly of the piston and seal assembly 10; hence, components disposed on the axially opposite side of the piston and seal assembly are deemed to be disposed "forwardly" thereof. Another convention employed herein establishes radial directions, both inwardly and outwardly, as being relative to the centerline ℄ of the annular piston and seal assembly 10, which is disposed generally as depicted in FIG. 1.

The elastomeric seal covers the cylindrical edges 46 of the core 42. Specifically, an annular skirt portion $70_A$ of the elastomeric seal 44 encircles, and is preferably bonded to, the radially outer cylindrical edge $46_A$ on the wall 47 of the core 42. The cylindrical edge $46_A$ opposes the radially outer interior wall 64, of the annular piston chamber 38. Similarly, an annular skirt portion $70_B$ of the elastomeric seal 44 engages, and is preferably bonded to, the radially innermost cylindrical edge $46_B$ of the core 42. The cylindrical edge $46_B$ opposes the radially inner interior wall $64_B$ of the annular piston chamber 38.

The elastomeric seal 44 is formed to provide retaining flanges $72_A$ and $72_B$ that extend radially inwardly and radially outwardly from the annular skirt portions $70_A$ and $70_B$, respectively, to engage radially outer and radially inner portions of the axially facing forward surface 74 of the core 42—which faces toward the pressure apply, disk assembly 48.

The opposed bases 56 of the force transfer rings 52 serve as spring seats for the springs 54 which extend between the core 42 and the annular apply disk 50. As depicted in FIG. 1, the bases 56 directly engage a portion of the forward surface 74 on the core 42. Thus, the retaining flanges 72 extend over only a sufficient portion of the forward surface 74 on the core 42 to effect a bond. This permits direct engagement between the bases 56 on the force transfer rings 52 and the surface 74 of the core 42.

The radially outer and radially inner lip portions 76 and 78, respectively, extend radially outwardly and radially inwardly from the body portion 80 of the seal 44. From a frame of reference, located exteriorly with respect to the radially outer lip portion 76 of seal 44, the outer periphery 66 of the lip portion 76 has a first concave surface 82 that is tangentially contiguous with, and extends radially outwardly and axially rearwardly, from the radially outer surface 84 on skirt portion $70_A$. The first concave surface 82 merges tangentially with a convex surface 86 that continues to extend radially outwardly and axially rearwardly. In the unstressed condition of the elastomeric seal 44, as depicted in FIGS. 2 and 3, the radially outer lip portion 76 extends tangentially from the convex surface 86.

Although the radially outer surface 88 on the lip portion 76 is preferably a second concave surface that extends tangentially from the convex surface 86, a frusto-conical surface (not shown) is deemed to be acceptable for most instances inasmuch as an exterior surface configuration of either shape on the radially out lip portion 76 has been found to establish an anti-leakage seal between the seal 44 and the radially outer interior wall $64_A$ of the annular piston chamber 38.

Figure 3:
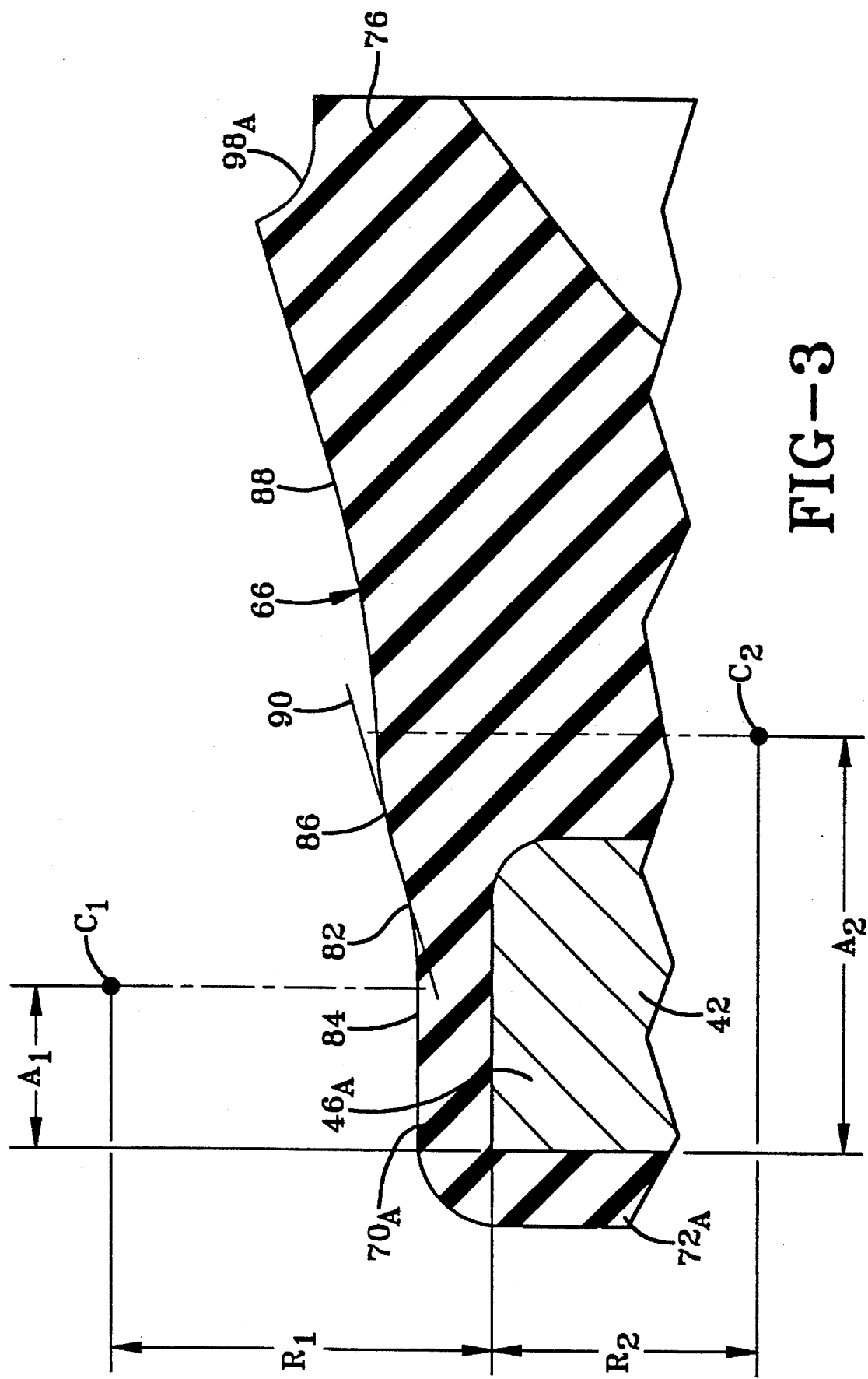
FIG. 3 is a further enlarged area of that portion of FIG. 2 that is included within the chain-line ellipse and designated "SEE FIG. 3"
Figure 4:
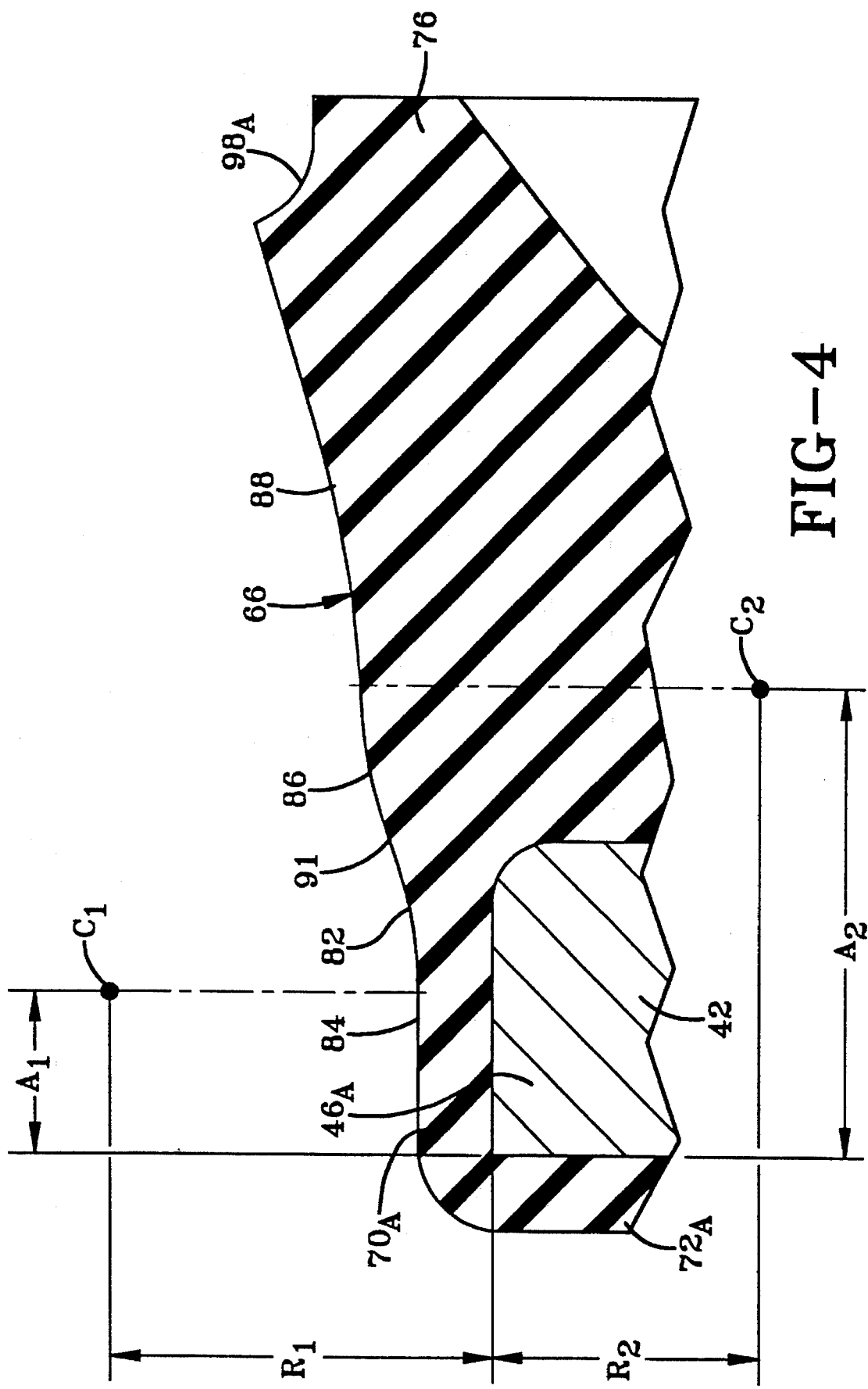
FIG. 4 is a view similar to FIG. 3 but depicting an alternative arrangement.

It should also be noted that the convex surface 86 may, as shown, contiguously merge into the concave portion 82, or a conical connecting portion 90 may be disposed to extend conically between the surfaces 82 and 86 (FIG. 4)—as along the reference 91 that is disposed in tangential relation to both the first concave surface 82 and the convex surface 84 (FIG. 3). Hence, by using the conical reference 91 as a connecting surface 90, and displacing the convex surface 86 axially rearwardly and radially outwardly to maintain the tangential merger of the conical reference 91, as surface 90, with the convex surface 86 as well as the concave surface 82, the alternative variation depicted in FIG. 4 is accomplished.

Although the contiguous arrangement of the surfaces 82 and 86 is preferred, in some seal and piston arrangements, it may be desirable to have the convex surface 86 located more rearwardly and radially outwardly of the concave surface 82—while maintaining the tangential relation between the surfaces 82 and 86.

The combination of the first concave surface 82 and the convex surface 86 interposed between the exterior surface 84 of the skirt portion $70_A$ and the exterior surface 88 of the lip portion 76 have been found, when used in combination with the rigid core 42, to provide a sealing engagement with the radially outer interior wall $64_A$ of the annular piston chamber 38 while maintaining a clearance 92 between the exterior surface 88 on the skirt portion $70_A$ of the seal 44 and the wall $64_A$ of the piston chamber 38. The provision of the clearance 92 prevents interference between the wall $64_A$, the seal 44 and the core 42, thereby preventing tearing of the seal 44 at the rear juncture of the seal 44 and the core 42.

Figure 5:
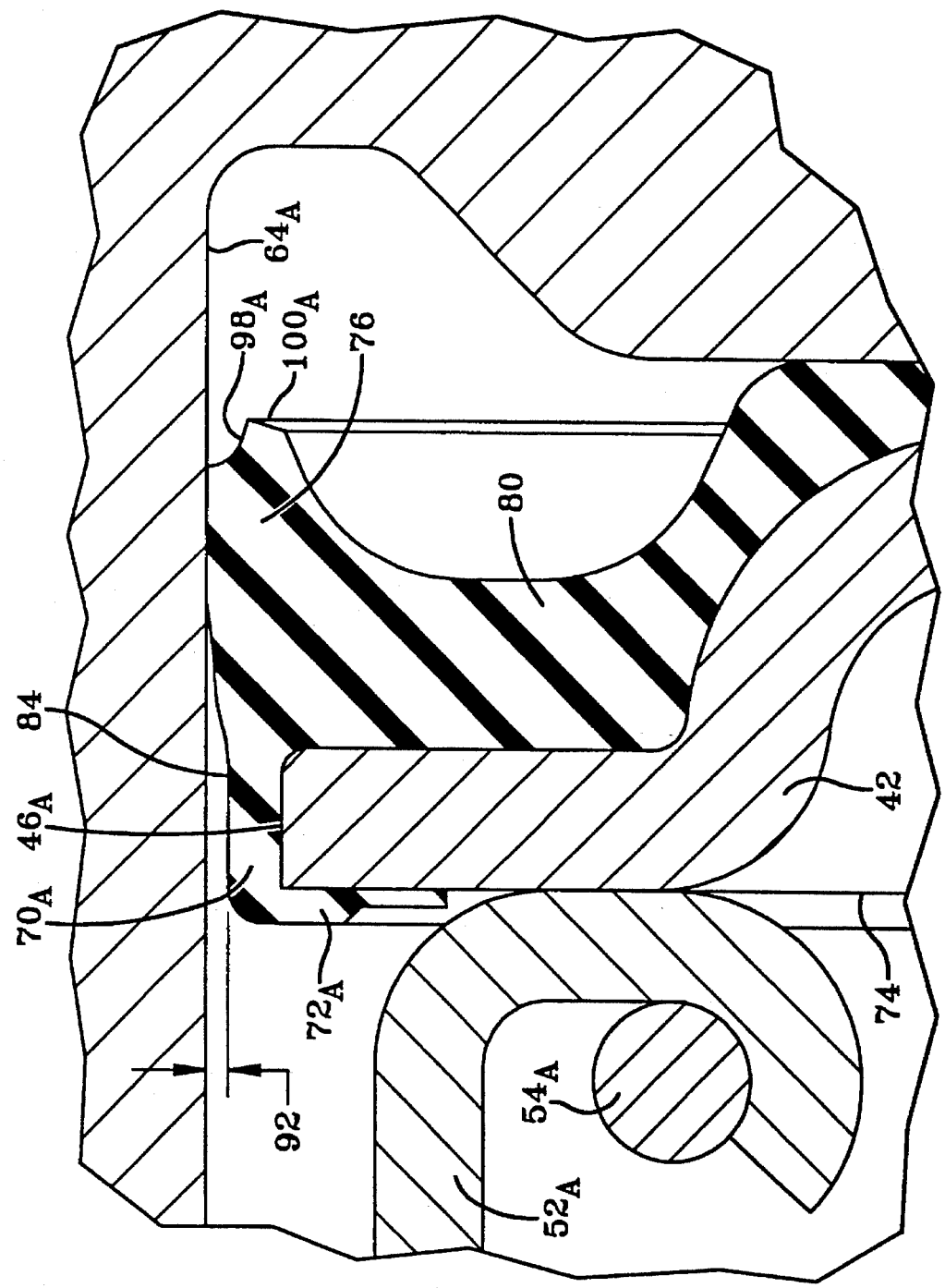
FIG. 5 is an enlarged view of that portion of FIG. 1 that is included within the chain-line circle and designated "SEE FIG. 5" but which represents the configuration of that portion of the piston and seal assembly when exposed to an operating temperature of seventy degrees Fahrenheit (21.1° C.)
Figure 6:
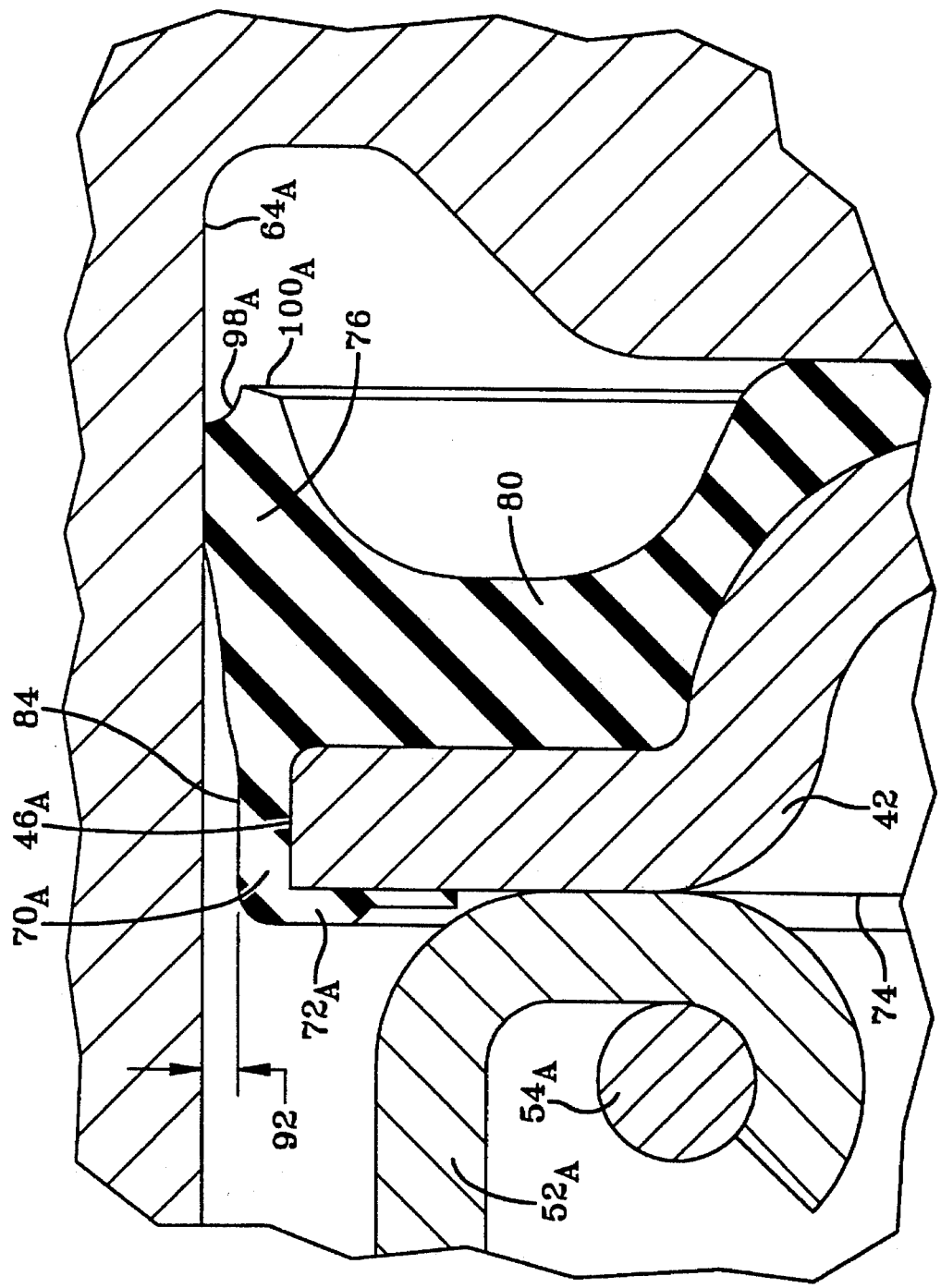
FIG. 6 is an enlarged view similar to FIG. 5 but which represents the configuration of that portion of the piston and seal assembly when exposed to an operating temperature of three hundred degrees Fahrenheit (148.9° C.); and, FIG. 7 is an enlarged view similar to FIGS. 5 and 6 but which represents the configuration of that portion of the piston and seal assembly when exposed to an environmental temperature of minus thirty degrees Fahrenheit (–34.4° C.).
Figure 7:
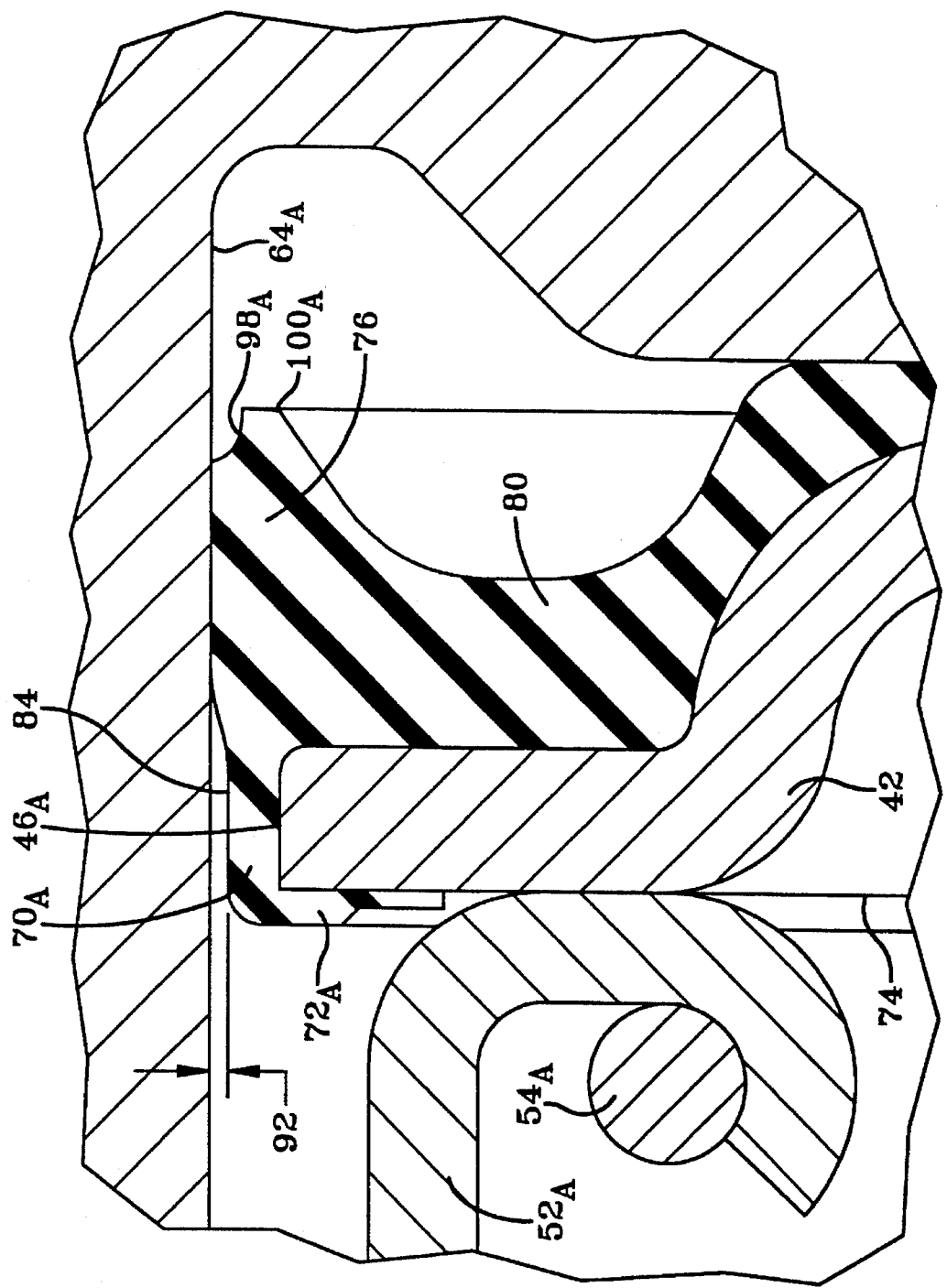

As seen in FIGS. 5 through 7, the clearance 92 is maintained throughout the operating temperature range of the transmission while the concave surface 82, the convex surface 86 and the radially outer surface 88 on the lip portion 76 continue to seal the pressure subchamber 40.

By way of example, it has been found that, at the minimum temperature, a radius of 2.5 mm for the first concave surface 82 and a radius of 2.5 mm for the convex surface 86 will provide an installed mean clearance of 0.24 mm in a cylinder having a mean diameter of 329 mm. The clearance increases at the maximum temperature to approximately 0.48 mm. These clearances maintain good sealing properties between the piston and seal assembly 10 and the piston chamber 38. With the above example, the second concave surface 88 on the radially outer lip portion 76 may have a radius of approximately 7.0 mm. It has been found that by initiating the convex surface 86 axially rearwardly of the exterior surface 84 on the skiff portion $70_A$, the undesired interference between the piston and seal assembly 10 and the radially outer interior wall $64_A$ of piston chamber 38 is eliminated, and the useful life of the seal 44 is extended.

To provide a further derailed dimensional presentation for the example of the piston and seal assembly 10 depicted, the radial dimension $R_1$ from the cylindrical edge $46_A$ of the core 42 to the center $C_1$ of the concave arcuate surface 82 is 2.96 mm, and the center $C_1$ is offset axially rearwardly at a dimension $A_1$ from the forward surface 74 of the core 42, as shown in FIG. 3. In the example depicted, the offset dimension $A_1$ is 0.98 mm. Continuing with the example depicted, the core 42 is 1.91 mm thick, and the center $C_2$ for the convex surface 86 is located radially inwardly from the cylindrical edge $46_A$ at a radial dimension $R_2$, and that dimension is 1.79 mm. The center $C_2$ is axially rearwardly offset at a dimension $A_2$ from the forward surface 74 of the core 42, and the dimension $A_2$ is 2.55 mm. In view of the representative dimensions for the exemplary arrangement depicted in FIG. 3, it should be apparent that the first concave surface 82 spans axially across the axial location of the rearwardly facing surface 68 on the wall 47 of the core 42. Accordingly, the convex surface 86 is located axially rearwardly and radially outwardly of the concave surface 82 irrespective of whether the two surfaces 82 and 86 are successively contiguous or axially spaced.

The same configuration may be employed for the radially inner surface 94 on the radially inner lip portion 78, but experience has shown that the configuration of the radially inner lip portion 78 is not really as critical as the configuration of the radially outer lip portion 76. Hence, the radially inner lip portion 78 may, as shown, extend radially inwardly and axially rearwardly from the radially inner surface 96 on skin portion $70_B$ along an extended concave surface 98. To continue the detailed dimensional presentation for the exemplary piston and seal assembly 10 depicted, the center $C_3$ (FIG. 2) for the second concave arcuate surface 88 is located radially outwardly from the cylindrical edge $46_B$ at a dimension $R_3$, and the dimension $R_3$ is 7.6 mm. The center $C_3$ is offset axially rearwardly at a dimension $A_3$ from the forward surface 74 of the core 42. In the example depicted, the offset dimension $A_3$ is 3.13 mm.

In either event, the axially rearwardly extent of the lips 76 and 78 may terminate an a concave recess 98 to effect a spacial separation between the surface on the lip that engages the walls of the piston chamber and the axially rearmost wall 100 of the respective lips 76 an 78. As shown, the lip 76 includes a concave recess $98_A$ between the second concave surface 88 and the rearmost wall $110_A$, and the lip 78 includes a concave recess $98_B$ between the radially inner surface 94 and the rearmost wall $100_B$.

While only a preferred embodiment of the present invention is disclosed, it is to be clearly understood that the same is susceptible to numerous changes apparent to one skilled in the art. Therefore, the scope of the present invention is not to be limited to the details shown and described but is intended to include all changes and modifications which come within the scope of the appended claims.

As should now be apparent, the present invention not only teaches that a piston and seal assembly embodying the concepts of the present invention is not only capable of withstanding exposure to considerable temperature fluctuations without deleterious affects, but also that the other objects of the invention can be likewise accomplished.

The embodiments of the invention in which an exclusive property or privilege is claimed are defined as follows:

1. A piston and bonded seal assembly comprising:

a rigid, annular core member having a cylindrical edge extending axially between an axially facing forward surface and an axially facing rearward surface;

an elastomeric seal member bonded to said core member;

said elastomeric seal member covering at least a portion of both said axially facing forward and rearward surfaces and having a skirt portion embracing said cylindrical edge of said core member;

at least one lip portion extending radially outwardly and axially rearwardly of said skirt portion;

said skirt portion merging into a concave annular surface;

a convex annular surface extending radially outwardly and axially rearwardly with respect to said concave surface;

an annular sealing surface presented from said lip portion and extending radially and axially outwardly from said convex surface;

said skirt portion having an exterior surface;

said exterior surface of said skirt portion being radially inward of said annular sealing surface.

2. A piston and bonded seal assembly, as set forth in claim 1, wherein:

said convex surface is located substantially rearwardly with respect to said axially facing rearward surface on said core member.

3. A piston and bonded seal assembly, as set forth in claim 1, further comprising:

a conical connecting portion extending tangentially between the concave and convex surfaces.

4. A piston and bonded seal assembly, as set forth in claim 1, wherein the lip portion has an annular concave surface extending substantially tangentially outwardly from said convex surface.

5. A piston and bonded seal assembly comprising:

a rigid, annular core member having a radially extending outer, annular wall portion defined between an axially forwardly facing, radial surface, an axially rearwardly facing, radial surface and a radially outer, cylindrical edge;

an elastomeric seal member bonded to said core member;

said elastomeric member having a skirt portion covering said radially outer cylindrical edge and on a least a portion of both said radial surfaces;

an annular seal portion extending outboard with respect to said rearwardly facing surface on the annular wall of said core;

a radially outer, annularly extending concave surface adjacent said skirt portion and spanning axially across the axial location of said axially rearwardly facing radial surface;

a radially outer, annularly extending convex surface merging tangentially with said concave surface and extending rearwardly therefrom; and, a lip portion having a radially outwardly facing surface extending radially and axially outwardly of said convex surface;

said skirt portion having an exterior surface;

said exterior surface of said skirt portion being radially inward of said radially outwardly facing surface of said lip portion.

6. A piston and bonded seal assembly, as set forth in claim 5, further comprising:

a tangential connecting portion contiguous between the concave and convex surfaces.

7. A piston and bonded seal assembly, as set forth in claim 5, wherein the lip portion has an annular concave surface extending substantially tangentially rearwardly from said annularly extending convex surface.

8. A piston and bonded seal assembly disposed within a cylinder having an interior cylinder wall, said piston and bonded seal assembly comprising:

a rigid, annular core member having a radially extending outer, annular wall portion defined between an axially forwardly facing, radial surface, an axially rearwardly facing, radial surface and a radially outer, cylindrical edge;

an elastomeric seal member bonded to said core member;

said elastomeric seal member covering at least a portion of both said axially facing forward and rearward surfaces and having a skirt portion embracing said cylindrical edge of said core member;

at least one lip portion extending radially outwardly and axially rearwardly of said skirt portion;

said skirt portion merging into a concave annular surface;

a convex annular surface extending radially outwardly and axially rearwardly with respect to said concave surface;

an annular sealing surface presented from said lip portion and extending radially and axially outwardly from said convex surface;

said skirt portion having an exterior surface;

said exterior surface of said skirt portion being maintained at a distance from said interior cylinder wall when said annular sealing surface contacts said interior cylinder wall.

9. A piston and bonded seal assembly, as set forth in claim 8, wherein:

said convex surface is located substantially rearwardly with respect to said rearwardly facing surface on said core member.

10. A piston and bonded seal assembly, as set forth in claim 8, further comprising:

a conical connecting portion extending tangentially between the concave and convex surfaces.

11. A piston and bonded seal assembly, as set forth in claim 8, wherein the lip portion has an annular concave surface extending substantially tangentially outwardly from said convex surface.

12. A piston and bonded seal assembly, as set forth in claim 8, wherein said exterior surface of said skirt portion is maintained at said distance from said interior cylinder wall when said sealing surface contacts said interior cylinder wall in environments having temperatures ranging from −30 degrees Fahrenheit (−30° F.) to 300 degrees Fahrenheit (300° F.).

* * * * *